United States Patent [19]
Marciniak et al.

[11] Patent Number: 4,677,635
[45] Date of Patent: Jun. 30, 1987

[54] RF-EXCITED $CO_2$ WAVEGUIDE LASER WITH EXTENDED TUNING RANGE

[75] Inventors: Hans C. Marciniak, Anaheim, Calif.; Frank E. Goodwin, Burke, Va.

[73] Assignee: Hughes Aircraft Company, Los Angeles, Calif.

[21] Appl. No.: 786,371

[22] Filed: Oct. 10, 1985

[51] Int. Cl.[4] .......................... H01S 3/22; H01S 3/10
[52] U.S. Cl. ......................................... 372/55; 372/20
[58] Field of Search ...................... 372/55, 19, 20, 64, 372/82, 102

[56] References Cited

U.S. PATENT DOCUMENTS 4,122,412 10/1978 Hughes .............................. 372/102
4,490,021 12/1984 Moya .................................. 372/102

Primary Examiner—Gene Wan
Attorney, Agent, or Firm—Ronald L. Taylor; A. W. Karambelas

[57] ABSTRACT

A high pressure $CO_2$ laser waveguide having an extended tuning range. The laser cavity is bounded by a first partially reflecting member and a second partially reflecting member, the second member comprising a reflecting mirror and a diffraction grating member used in the Littrow configuration, the grating being positioned outside the laser cavity and spaced from the second reflecting mirror a predetermined distance. The combination of the mirror and grating provides an effective grating reflectivity which is sufficient to extend the tuning range of the laser to a value not previously available.

23 Claims, 4 Drawing Figures

RF-EXCITED CO₂ WAVEGUIDE LASER WITH EXTENDED TUNING RANGE

BACKGROUND OF THE INVENTION

1. Field of the Invention

The present invention relates to a high pressure, RF-excited $CO_2$ waveguide laser having an extended tuning range.

2. Description of Related Art

Wide-band tunable $CO_2$ lasers have been needed for applications in laser communications, optical radar, pollution detection, and spectroscopy. The tuning range of a conventional low pressure $CO_2$ laser is limited by the relatively small Doppler width of the $CO_2$ laser transition. The development of the waveguide gas laser and its extension to high pressure sealed-off waveguide $CO_2$ lasers has resulted in pressure broadening of the laser transition and larger available gain bandwidth for frequency tuning.

In an article by R. L. Abrams, "Gigahertz Tunable Waveguide $CO_2$ Laser", *Applied Physics Letters* 25,304 (1974), a sealed off cw waveguide $CO_2$ laser is described which has been continuously tuned over 1.2 GHz on a single transition of 10.6 μm. The laser consists of a 9.5 cm × 1.0 mm square discharge tube fabricated from polished BeO slabs. Line selection is achieved with a diffraction grating and tuning may be accomplished by piezoelectric control of the resonator length. It has been shown that, for a given resonator loss and output coupling, the gas pressure for optimum output power also results in maximum tunability. In order to achieve gigahertz tuning from a cw $CO_2$ laser, under optimum conditions, smaller discharge diameters and correspondingly higher pressures are required. In the Abrams laser, a totally reflecting laser mirror is mounted on a bender bimorph and the opposite end of the waveguide laser is fitted with a 97% reflecting 150-lines/mm diffraction grating used in the Littrow configuration for line selection. Attempts to extend the technique to smaller discharge diameters and thus higher operating pressures and larger tuning ranges using a diffraction grating for line selection were unsuccessful.

Since it is known that RF-excited $CO_2$ waveguide lasers can support a discharge at higher gas pressures than cw (dc) lasers and thus theoretically increase the tuning range above 1.2 GHz, prior attempts have been made to modify a RF-excited $CO_2$ laser by replacing the laser transmitting mirror with a grating (for line selection) with the expectation that the tuning range could be increased above the 1.2 GHz provided by the cw laser. However, the results were similarly unsuccessful.

Certain applications require that the tuning range of $CO_2$ waveguide lasers extend above 1.2 GHz. For example, satellites in low altitude orbits generally utilize optical sources, such as lasers, for communicating information between satellites and ground stations. These satellites require accommodation to be made for the Doppler frequency shift of $\Delta V = V/\lambda$, wherein V is the relative velocity between a transmitting and receiving satellite, and λ is the wavelength of the transmitted optical light, at the receiver, as the satellites approach each other. A tuning range of at least 1500 MHz (±750 MHz) would make possible the noted Doppler accommodation.

Thus, with the current limitation in tunability, a heterodyne receiver with complex signal processing to recover the message must be used on the receiver satellite to accommodate for the full Doppler shift in this application, increasing the cost and complexity of the overall system.

What is desired, therefore, is to provide a $CO_2$ waveguide laser having a predetermined line and a tuning range encompassing 1500 MHz thus enabling the laser to be utilized with the satellite system previously described, (and in other applications requiring extended laser tuning ranges) this in turn allowing an inexpensive and less complex system for processing signal information to be utilized by the receiving satellite.

SUMMARY OF THE INVENTION

The laser of the present invention is fabricated from four polished BeO slabs expoxied together to form a waveguide typically on the order of 1 mm square. Vacuum flanges enclose the rectangular outer dimensions of the tube and are joined to the BeO slabs via a surrounding cylindrical enclosure. The mirror mounts and piezoelectric tuning element are mounted by means of mating flanges. Evacuation and gas fill are provided by a feedthrough in one of the flanges and cooling is provided by conduction to a water-cooled aluminum heat sink. The partially reflecting laser mirror is mounted for movement in the axial direction of the laser cavity to a bender bimorph, the opposite end of the waveguide laser beam fitted with a reflecting diffraction grating used in the Littrow configuration and an adjacent mirror, the mirror-grating combination increasing the effective reflectivity of the grating to a value necessary for the tuning range reguired. The three mirror cavity laser, as described, provides a wide tuning range including frequencies above ±750 MHz about the 10.6 μm $CO_2$ line at a relatively high peak output power. The tuning range may be increased by reducing the mirror to mirror separation of the laser cavity. However, if the mirror separation is reduced beyond a predetermined limit, overall laser efficiency is degraded.

The present invention thus provides a high pressure $CO_2$ RF-excited waveguide laser, having an extended tuning range and which allows the laser to be used in applications which otherwise were impractical. For example, the $CO_2$ RF-excited laser can be utilized in a receiving satellite and in particular, to provide the reference source in a phase-locked receiver loop such that incoming information signals from an approaching satellite can be detected with simplified and non-complex circuitry which compensates for the aforementioned Doppler shift.

It should be noted that applicants have also discovered that a single grating theoretically could be utilized in place of the reflecting laser mirror to provide for line selection and extended tuning ranges. However, the absolute grating efficiency required would be on the order of at least 98%, and gratings of this efficiency are not commercially available at this time. Thus, the mirror-grating combination of the present invention provides an effective technique for achieving extended tuning ranges with currently available components and at a reasonable cost.

BRIEF DESCRIPTION OF THE DRAWING

For better understanding of the invention, as well as further features and objects thereof, reference is made to the following description, which is to be read in conjunction with the accompanying drawing wherein.

It should be noted that the same reference numerals identify identical components in each of the figures.

DETAILED DESCRIPTION OF THE INVENTION

Figure 1:
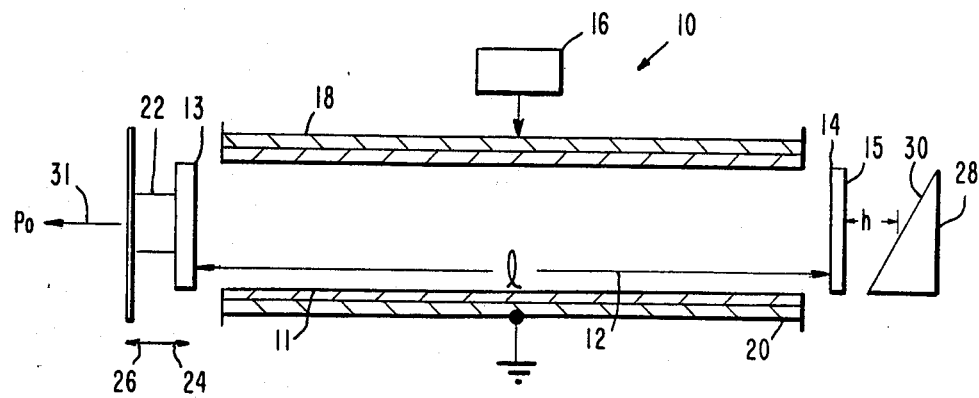
FIG. 1 is a simplified cross-sectional view of the $CO_2$ laser of the present invention.

FIG. 1 shows, in a simplified form, a cross-sectional view of a high pressure RF-excited $CO_2$ waveguide laser 10 in accordance with the teachings of the present invention. The laser waveguide comprises a square or rectangularly shaped discharge tube 11 having a cavity 12 of an active laser length 1 extending between the surface of a partially reflecting mirror 13 and the surface of partially reflecting mirror 14. An active gaseous medium, such as $CO_2$, and a fill gas, such as helium, are introduced into cavity 12 by conventional techniques. A source of RF energy 16 is applied to waveguide electrode 18, a metal support structure 20 on the opposite side of electrode 18 being grounded as illustrated. The partially reflecting mirror 13 is mounted on a piezoelectric (or bimorph) structure 22 which allows the mirror 13 to be moved towards mirror 14 in the direction of arrow 24 or away from mirror 14 in the direction of arrow 26. A grating 28 having an inclined surface 30 is positioned a distance h from the rear surface 15 of mirror 14 as illustrated. Diffraction grating 28 is used in the Littrow configuration for line selection as is well known in the art. The output laser beam 31 of power $P_0$ is transmitted via output coupling mirror 13.

The expression for the tuning range of a homogeneously (pressure) broadened laser line, such as for laser 10, is given by:

$$2(V_c - V_o) = \Delta V \left( \frac{g_o L}{\ln (r_1 r_2) - \frac{1}{2}} - 1 \right)^{\frac{1}{2}} \quad (1)$$

where
$V_c - V_o$ is tuning range from line center to cessation of laser oscillation (MHz)
$g_o$ is the small-signal gain coefficient at line center $(cm^{-1})$
L is the active laser length (cm)
$\Delta V$ is the collision broadened linewidth - (MHz)
$\Delta V$ is approximated as $$\Delta V = 7.58 \, [PCO_2 + 0.6 \, PHe] \left( \frac{300}{T} \right)^{\frac{1}{2}} \quad (2)$$

where
$PCO_2$ is the partial pressure $CO_2$ in Torr
$PHe$ is the partial pressure of He in Torr
T is the absolute temperature in °K
$\Delta V$ is given in MHz The expression $r_1$ in equation (1) refers to the reflectivity of mirror 13 and $r_2$ is the effective reflectivity of the mirror 14 and the grating 28.

In both the DC and RF laser configurations, the grating 28 is a key element in the overall operation of the laser, particularly with regards to tuning range. The grating both selects the laser line and in accordance with equation (1) enables the tuning range to be extended based on the efficiency of the grating. In essence, a high efficiency grating provides an extended tuning range while lowering laser energy loss.

Theoretical and experimental results have indicated that in order to get the higher tuning ranges required for the type of application indicated previously, it is necessary that an absolute grating efficiency of at least 98% be provided if only a single grating is utilized to replace the normally transmitting laser cavity mirror. However, no grating of this efficiency is commercially available. In accordance with the teachings of the present invention, to overcome this deficiency, a mirror-grating combination which enhances the efficiency of the grating, without degrading its line selecting characteristics, has been provided. As will be described hereinafter in more detail, the combination results in a tuning range, for the 10.6 $\mu$m $CO_2$ line, of approximately ±770 MHz with a peak output power of 290 mW and a minimum output power of 125 mW. The tuning range is limited by the active laser length. Slightly greater tuning ranges may be possible by shortening the distance between mirrors up to the point that the discharge is extinguished.

However, laser efficiency becomes degraded at short mirror distances and thus tuning range is preferably set by selecting appropriate mirror reflectivities. In particular, equation (1) shows that the $r_1 r_2$ product has to be increased in order to increase the tuning range. Although the prior art indicated that increased pressures would increase the tuning range (equation (2) would appear to confirm this since $\Delta V$ is proportional to the total pressure) this is not actually the case since $g_o$ decreases with increasing pressures beyond a certain pressure. The solution is to increase $r_2$, the effective reflectivity of the grating since $r_1$ is typically high.

In accordance with the teachings of the present invention enhanced reflectivity at the grating end of the laser 10 is achieved by the addition of second partially reflecting mirror 14 of reflectivity $r_3$ adjacent the grating 28. The maximum effective reflectivity, $r_2$ (eff), of this mirror grating combination is higher than the reflectivity of mirror 14 or grating 28 alone. The output of the laser 10 is taken from mirror 13 as illustrated. It has been determined that the required reflectivity for a tuning range greater than ±750 MHz is achieved by an $r_1$, $r_2$ (eff) product of 0.97. Thus where $r_1 = 0.99$, $R_2$ (eff) must be 0.98.

Figure 2:
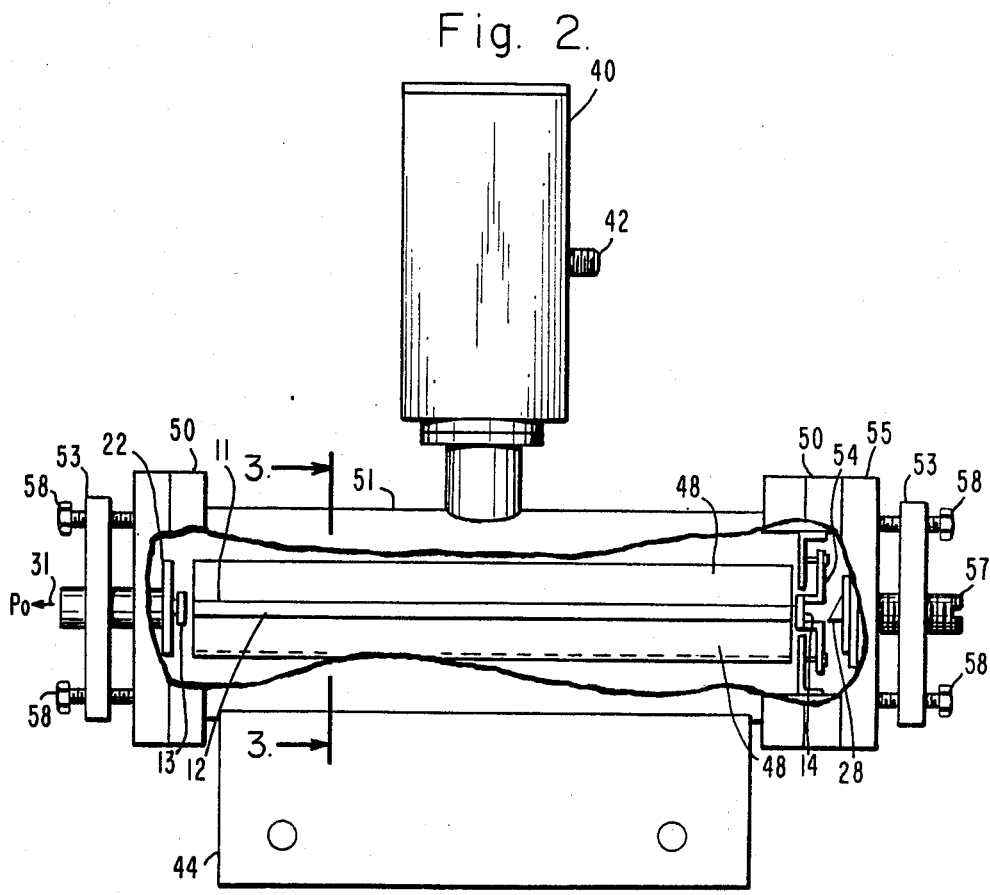
FIG. 2 is a schematic diagram of the high pressure, RF-excited $CO_2$ waveguide laser of the present invention.

The effective reflectivity of a mirror-grating ($r_2$ (eff)), combination with a beam normally incident on mirror 14 and the grating in the Littrow configuration as illustrated in FIG. 2 is given by $$r_2 \text{ (eff)} = \frac{r_3 + t^2 r_2 - 2t\sqrt{r_3 r_2 \cos\delta}}{1 + t_2 r_2 r_3 - 2t\sqrt{r_3 r_2}} \quad (3)$$

where $$\delta = \frac{4n}{\lambda} h \text{ (radians)}$$

$r_3$ = reflectivity of mirror 14
$r_2$ = reflectivity of grating 28 for selected $CO_2$ line
t = transmission of the medium; t = 1-LD, where $L_D$ = diffraction loss
$\lambda$ = wavelength of incident beam
h = separation of mirror 14 and midpoint of grating 28
n = refractive index; n = 1 for air filled laser cavity As an example, if $r_3 = 92\%$, $r_2 = 96\%$, (an actual realizable reflectivity of grating 28) and $L_D = 12\%$, a reflectivity of 98% or greater can be maintained over a variation of $\delta$ of $\pm 2$ radians. For a $\lambda$ of 10.6 $\mu$m, h can vary about an average h, designated as $h_o$ by $\pm 1.6 \times 10^{-4}$ cm. If $h_o$ was chosen to be 1 cm, and Invar steel is used in the mirror grating cavity construction, a temperature variation of $\pm 80°$ C. would be permitted. Should higher effective reflectivities be required, the tolerable temperature range would be reduced. However, the mirror grating cavity would still have relatively low sensitivity to temperature changes.

Figure 4:
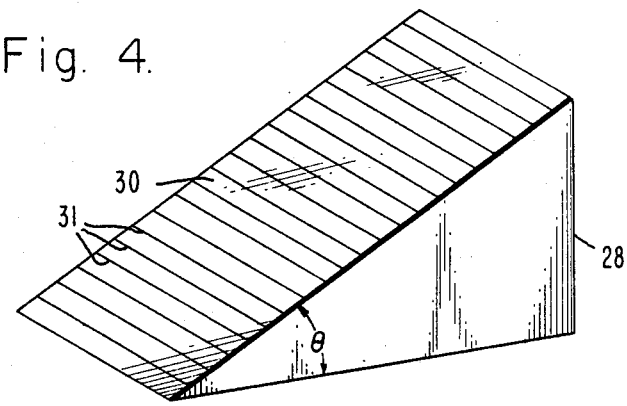
FIG. 4 is perspective view of a grating which may be utilized in the present invention.

A perspective view of a grating 28 (not to scale) which may be utilized in the present invention, is shown in FIG. 4. Typically, the number of rulings 31 on the inclined surface 30 of the triangularly shaped prism is approximately 150 grooves/mm, the overall dimensions of the grating being approximately $\frac{1}{4} \times \frac{1}{4}''$. The angle $\theta$ is given by the equation:

$$\sin \theta = \lambda/2 \quad (4)$$

with a = 1/150 mm. A rectangular shaped diffraction grating may also be utilized but the inclined prism 28 illustrated allows for easier mounting to the laser cavity. The angle $\theta$ is selected to enable the grating to provide the selected laser line. FIG. 2 shows a more detailed schematic diagram of the three mirror waveguide RF-excited local oscillator laser 10 in accordance with the teachings of the present invention. The laser schematic is shown with a cutout portion to illustrate the internal portions of the laser structure. An RF matching network 40 couples the RF energy power introduced at port 42 to laser 10 as illustrated. A water cooled aluminum block 44 is provided as the heat sink for laser 10. Laser 10 is fabricated from four polished BeO ceramic slabs 48, approximately 9.5 cm long, epoxied together to form a square, rectangular or cylindrical shaped discharge tube. Preferably the laser waveguide comprises a 9.5 cm $\times$ 1.5 mm square discharge tube. Copper gasketed vacuum flanges 50 are machined to fit over the outer bore member 51, the square discharge tube 11 being supported therein. Evacuation and gas ($CO_2$ and helium) fill are provided by a feedthrough in one of the flanges 50. Output coupling mirror 13 is supported adjacent laser cavity 12 by mating flange 53 via bimorph 22. Bimorph 22 comprises two oppositely poled piezoelectric disks bonded together. Application of a voltage across bimorph 22 causes a slight buckling, resulting in linear motion along the laser axis. Partially reflecting laser mirror 14 is mounted to the opposite end of the waveguide cavity by mirror assembly 54. A mating flange 55 supports and positions grating 28 a predetermined distance h from mirror 14 and threaded screw 57 is provided to adjust this distance if necessary. A plurality of aliqnment screws 58 are provided and are utilized to maintain proper aliqnment of mirrors 13 and 14 and qratinq 28.

Figure 3:
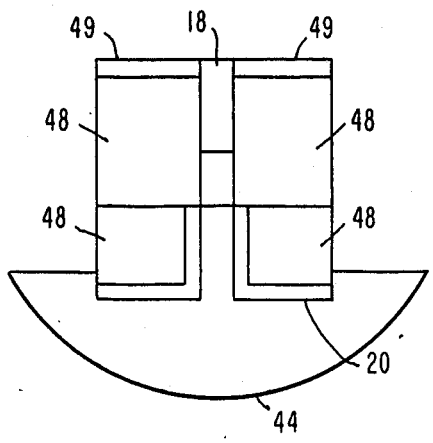
FIG. 3 is a cross-section along line 3—3 of FIG. 2.

FIG. 3 shows a cross-section along line 3—3 of FIG. 2 and shows the aluminum heat sink 44, metal ground support structure 20, RF electrode 18, $B_eO$ waveguide bore pieces 48 and an aluminum oxide cover plate 49. In the embodiment shown in FIG. 2, the mirror 13 is a 98% partial reflector, grating 28 has a reflectivity of 96% at the 10.6 $\mu$m line, and mirror 14 has a reflectivity of 99%.

The three mirror cavity laser shown in FIG. 2 provides a tuning range about the 10.6 $\mu$m line of $\pm 770$ MHz with a peak output power of 290 mW and a minimum power of 125 mW. This occurred with a He:$CO_2$ = 13:1 at a total pressure of 450 Torr and an input RF power of 35 watts at 145 MHz. It has been determined that the maximum tuning range for the $CO_2$ laser may be obtained at different He:$CO_2$ pressure ratios although different maximum and minimum output powers will result. The optimum output power occurs at a He:$CO_2$ ratio of 12:1 (these measurements are made at a total pressure in the range of 450–460 Torr).

The He:$CO_2$ pressure ratios typically vary from about 11:1 to about 13:1; the total pressure of the gas within the laser cavity varies from about 450 to about 500 Torr: the RF power applied to the laser varies from about 20 watts to about 40 watts and at a frequency which ranges from about 100 to about 150 MHz and typical tuning ranges vary from about $\pm 700$ MHz to about $\pm 770$ MHz.

The present invention thus provides a technique for maximizing the effective reflectivity of the grating used in a laser to expand the tuning range about the selected laser line. Current applications require a grating efficiency which could not be commercially provided, the present invention overcoming this problem by providing a mirror grating combination which provides an effective grating efficiency which is high enough to meet the aforementioned requirements, and which is also commercially available.

Although the technique described hereinabove has been utilized with RF energized $CO_2$ lasers, the principle can be adapted to DC excited $CO_2$ lasers, and to lasers using active mediums other than $CO_2$.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt the invention to a particular situation without departing from its essential teachings.

What is claimed is:

1. A laser for generating an output beam having frequencies within a predetermined range about a selected frequency line comprising:
   first and second partially reflecting members defining a laser cavity, said second partially reflecting member comprising a partially reflecting mirror and a diffraction grating member, the grating member being spaced a predetermined distance from said partially reflecting mirror;
   an active gaseous medium and a fill gaseous medium contained within said laser cavity; and
   means for energizing said active gaseous medium whereby said output laser beam is generated through said first reflecting member.

2. The laser of claim 1 further including means for varying the separation between said first and said second partially reflecting members in a manner such that said predetermined frequency range may be varied.

3. The laser as defined in claim 1 wherein said active gaseous medium comprises $CO_2$.

4. The laser as defined in claim wherein said fill gaseous medium comprises helium.

5. The laser as defined in claim 4 wherein the ratio of helium to $CO_2$ within said cavity is in a range from about 11:1 to about 13:1.

6. The laser as defined in claim 5 wherein the total pressure of said active and said fill gaseous mediums within said cavity is in a range from about 450 Torr to about 460 Torr.

7. The laser of claim 1 wherein said active gaseous medium is energized by a source of RF input power.

8. The laser of claim 7 wherein said input RF power is in the range from about 20 watts to about 40 watts and at a frequency in the range from about 100 MHz to about 150 MHz.

9. The laser of claim 1 wherein the effective reflectivity of the combination of said second partially reflecting mirror and said grating member is greater than the reflectivity of said grating member alone.

10. A high pressure, RF-excited waveguide laser comprising:
    a laser cavity defined by a first partially reflecting mirror separated from a second partially reflecting mirror, said laser cavity containing an active gaseous medium and a fill gaseous medium;
    a grating member positioned outside said laser cavity and spaced apart from said second partially reflecting mirror a predetermined distance; and
    means for energizing said active gaseous medium contained within said cavity with RF energy to cause said laser to generate a laser light output through said first partially reflecting mirror, said grating functioning to cause said laser light to have frequencies in a predetermined range about a selected line frequency for a fixed separation between said first and said second partially reflecting mirrors.

11. The laser of claim 10 further including means for varying the separation between said first and said second partially reflecting mirrors to vary the laser output frequencies from said predetermined range.

12. The laser as refined in claim 11 wherein said grating comprises a shaped prism having a plurality of grooves formed on an inclined surface of said prism.

13. The laser of claim 12 wherein said active gaseous medium comprises $CO_2$.

14. The laser of claim 13 wherein said fill gaseous medium comprises helium.

15. The laser of claim 14 wherein the ratio of the helium to $CO_2$ within said cavity is in a range from about 11:1 to about 13:1.

16. The laser of claim 15 wherein the total pressure of said active and said fill gaseous mediums within said cavity is in the range from about 450 to about 460 Torr.

17. The laser of claim 11 wherein said RF power is in the range from about 20 watts to about 40 watts and at a frequency of about 100 MHZ to about 150 MHz.

18. The laser of claim 10 wherein the effective reflectivity of the combination of said second partially reflecting mirror and said grating member is greater than the reflectivity of said grating member alone.

19. The laser of claim 10 wherein said predetermined tuning range is at least equal to $\pm 750$ MHz.

20. The laser of claim 19 wherein said selected line frequency corresponds to a wavelength of 10.6 $\mu$m.

21. The laser of claim 10 wherein said grating member comprises a diffraction grating used in the Littrow configuration for line selection.

22. The laser of claim 10 wherein said laser comprises a square discharge tube fabricated from four elongated ceramic members.

23. The laser of claim 22 wherein said ceramic comprises BeO.

* * * * *